June 2, 1959  W. F. RIDENOUR  2,889,029
LABEL APPLYING MACHINE
Filed April 24, 1956  6 Sheets-Sheet 5

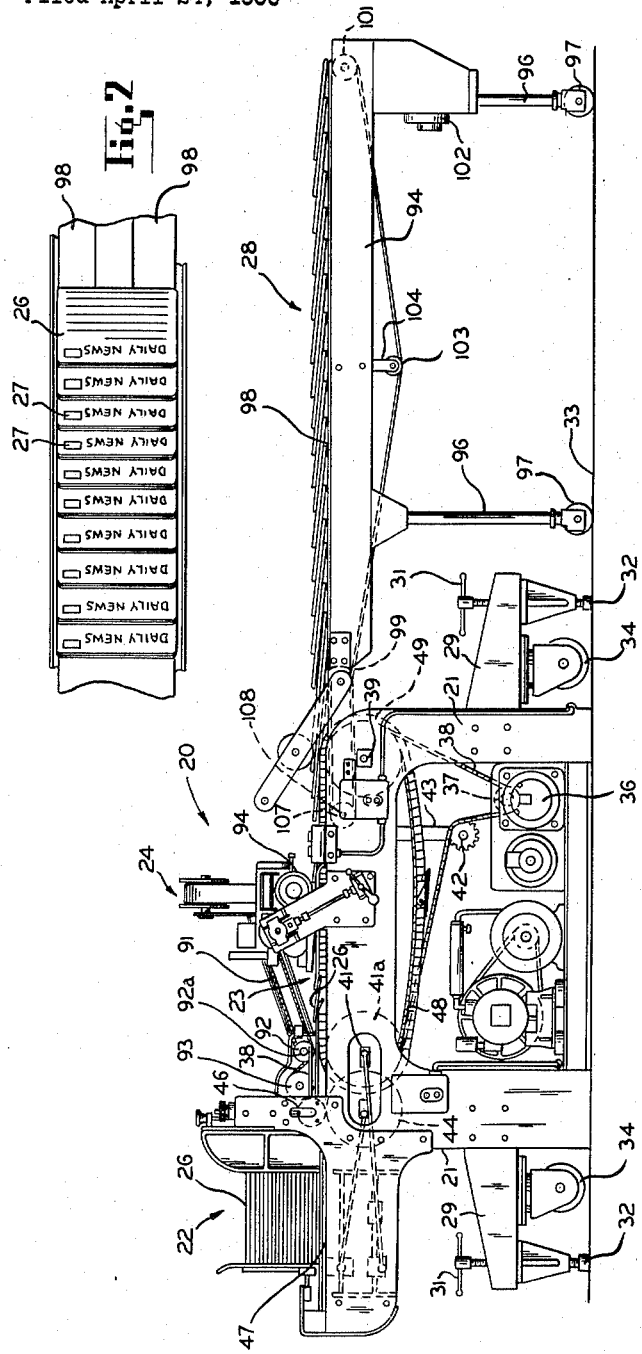

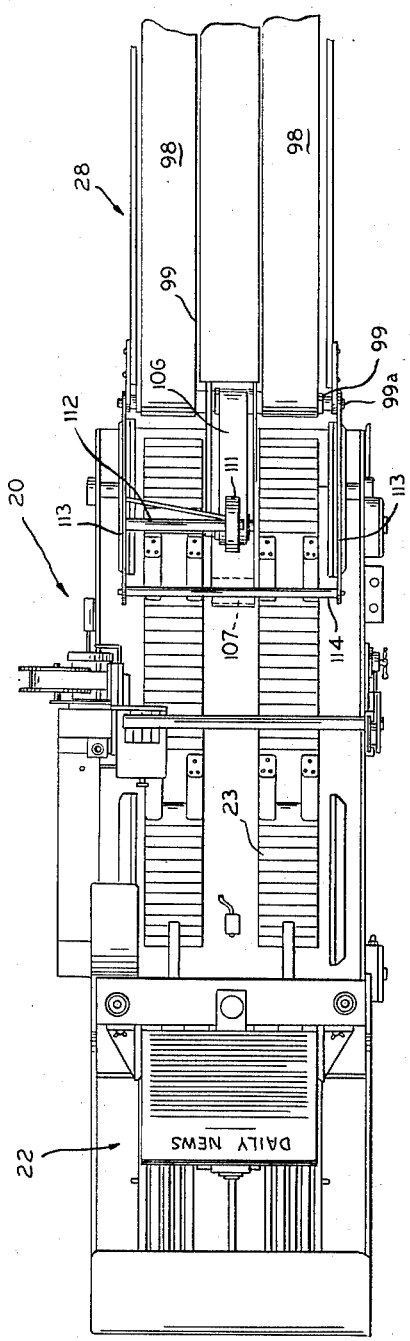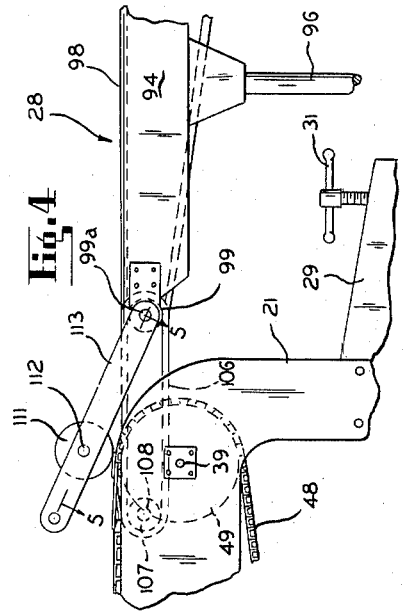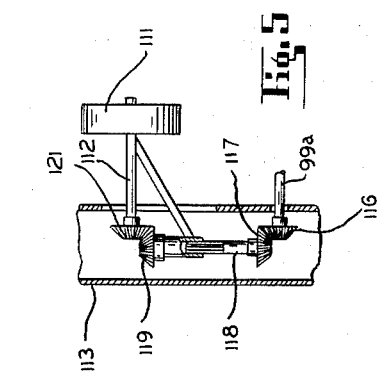

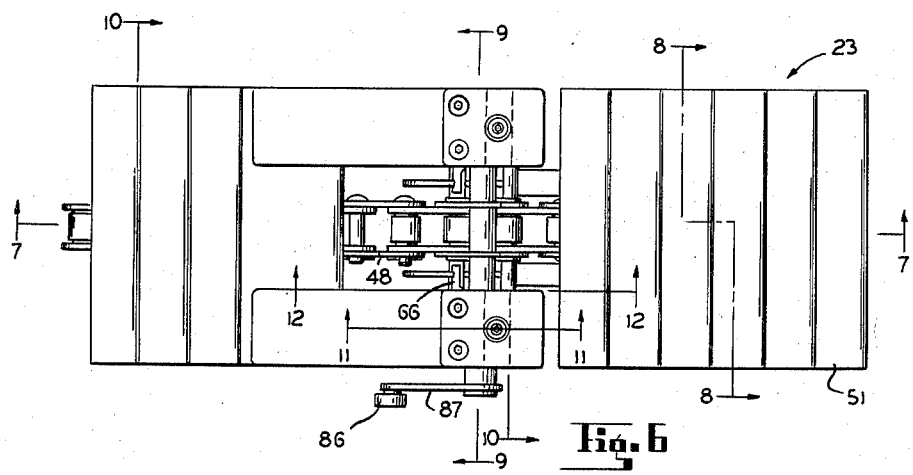
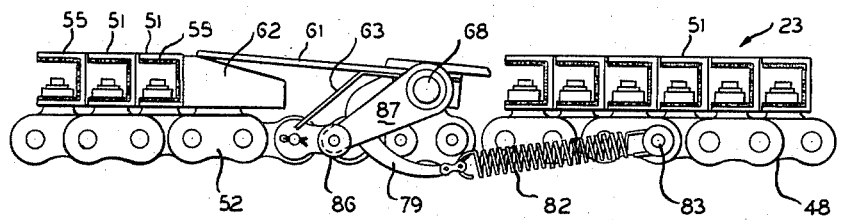
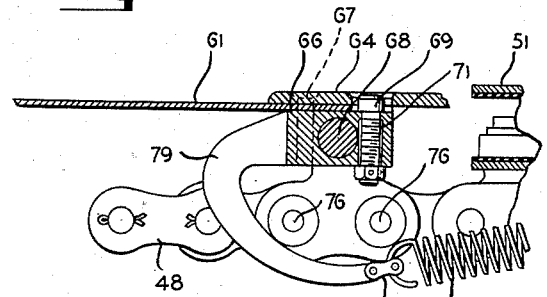
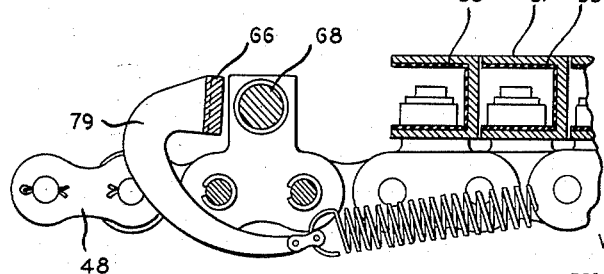

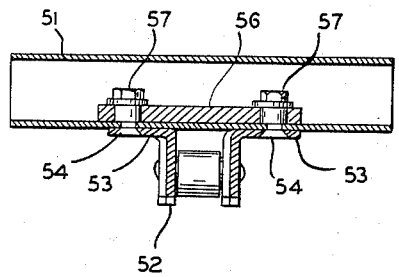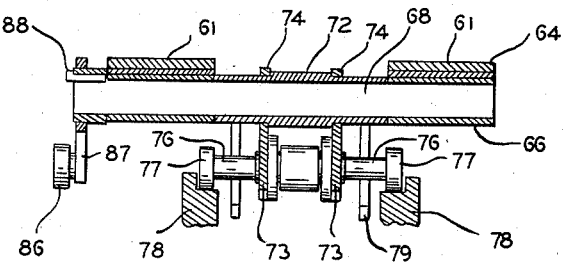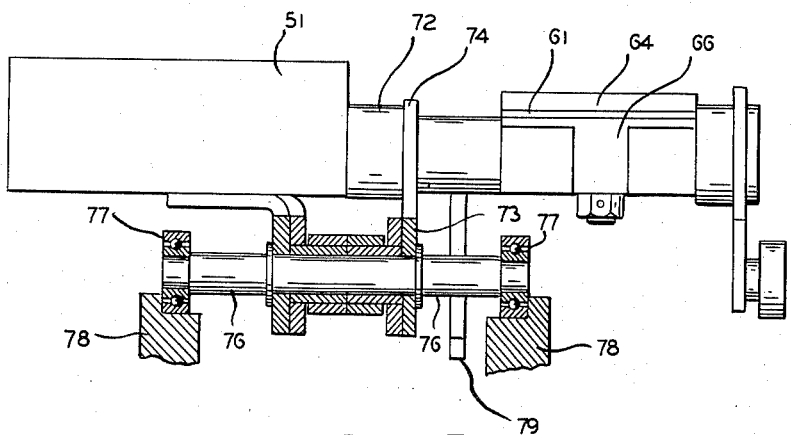

INVENTOR.
WAYNE F. RIDENOUR
BY
ATTORNEYS

INVENTOR.
WAYNE F. RIDENOUR
BY Foley and Lindberg
ATTORNEYS

United States Patent Office 2,889,029
Patented June 2, 1959

2,889,029

LABEL APPLYING MACHINE

Wayne F. Ridenour, Chicago, Ill., assignor to Cheshire, Incorporated, Chicago, Ill., a corporation of Illinois Application April 24, 1956, Serial No. 587,188

11 Claims. (Cl. 198—35)

This invention relates to machines for applying an address label to a magazine, newspaper or the like.

Ridenour Patent No. 2,606,681 discloses a label applying machine for newspapers or magazines. The articles to be labeled are moved past a label applying head at a continuous rate by means of a continuous conveyor, and are discharged on to a delivery conveyor extending longitudinally of the machine, the labeled articles being placed on such conveyor in overlapping or imbricated relationship. One of the disadvantages of such a delivery conveyor lies in the fact that each succeeding labeled article conceals the label of the previous labeled article.

Such machines are used in the mailing rooms of large publications, and the operators of the machines, called mailers, sort the labeled articles according to their destinations, i.e., according to States, counties, cities or other sub-divisions. In such previous machines it has been necessary to provide a delivery conveyor extending at right angles to the longitudinal axis of the mailing machine, so that the articles are conveyed along the delivery conveyor in partial overlapping or imbricating relationship, with the label in a displayed position, instead of being covered by a successive labeled article. However, the provisions of such additional delivery conveyors disposed in the fashion described requires extra space in the mailing room. Since nationally and even locally circulated magazines or newspapers are circulated in large numbers, the need for a compact label applying machine wherein the labeled magazines or newspapers are delivered in a condition with the label exposed, has been a long felt need in the publication industry.

With the foregoing considerations in mind, it is a principal object of this invention to provide a labeling machine wherein the labeled articles are delivered in a straight line fashion and also in a fashion whereby the label is displayed for reading of the intelligence thereon.

Another object of the invention is to provide a mailing machine wherein the labeled magazines or newspapers are delivered in a straight line underlapping in partial or imbricated relationship so as to keep within the space limitations required in a mailing room.

Still another object is to provide a mailing machine wherein the labels are applied to each magazine or newspaper in a continuous fashion at a high rate of speed, and wherein the so-labeled magazine or newspaper is delivered to a delivery conveyor moving at a rate considerably slower than the rate of the conveyor moving the articles or magazines past the labeling head, and whereby the labeled articles will move on the delivery conveyor with the articles in underlying imbricating relationship with the labels in position for viewing of the intelligence thereon.

Yet another object is to provide a conveyor for moving flat articles such as newspapers or magazines, said conveyor including a first conveyor stage having gripping means thereon engaging the leading edge of the newspaper or magazine, said article gripping conveyor delivering the labeled articles to a delivery or second stage conveyor movable at a lower speed than the article gripping conveyor, the article gripping conveyor including means for lifting the trailing edge of the last previous article delivered to the second stage conveyor so that each succeeding labeled article can thereafter move in partial underlapping relationship on the delivery or second stage conveyor with its label in a displayed position.

Yet another object comprehends a novel article gripping conveyor for moving articles past a labeling head, said conveyor having gripping means controlled by a cam and follower so as to grip the leading edge of an article, said gripping means being thereafter operated by the cam and follower to lift the trailing edge of a labeled article which has been delivered to a delivery conveyor, whereby the labeled article is moved in position beneath the last article delivered to the delivery conveyor in partial underlapping relation with respect thereto.

Other objects and important features of the invention will be apparent from a study of the specification following, taken with the drawings which together describe and illustrate a preferred embodiment of the invention, and what is now considered to be the best mode of practicing the principles thereof. Other embodiments of the invention may be suggested to those having the benefits of the teachings herein, and such other embodiments are intended to be reserved especially as they fall within the scope and spirit of the subjoined claims.

In the drawings which illustrate a preferred embodiment of the invention:

Fig. 1 is a side elevational view of an improved labeling machine having the improvements in conveyors according to the present invention embodied therein;

Fig. 2 is a plan view of the delivery conveyor of the machine shown in Fig. 1, showing how labeled articles are moved on the delivery conveyor in such a fashion as to be viewed readily by the mailer;

Fig. 3 is a plan view of the label applying machine seen in Fig. 1;

Fig. 4 is a detailed side elevational view of the delivery end of the label applying machine, showing a labeled article in position for delivery to the delivery conveyor;

Fig. 5 is a section taken along the line 5—5 of Fig. 4 looking in the direction of the arrows, and showing means for driving a pressure roller for applying pressure to the labeled article which has been delivered to the delivery conveyor;

Fig. 6 is a plan view to an enlarged scale of a portion of the article gripping conveyor for moving the articles to be labeled past a labeling head, and showing details of a cam follower mechanism for controlling the gripping of articles gripped at the leading edge thereof and moved by the article gripping conveyor;

Fig. 7 is a section taken along the line 7—7 of Fig. 6, looking in the direction of the arrows;

Fig. 8 is a section taken along the line 8—8 of Fig. 6 and looking in the direction of the arrows, showing the manner of attaching a flight of the article gripping conveyor to its conveyor chain;

Fig. 9 is a section taken along the line 9—9 of Fig. 6 looking in the direction of the arrows, showing details of a gripper mechanism for the articles moved by the article gripping conveyor, and showing details of a cam follower for controlling the gripper mechanism;

Fig. 10 is a section taken substantially along the line 10—10 of Fig. 6, looking in the direction of the arrows, and showing further details of the article gripper mechanism and the cam follower controlling the operation of the gripper mechanism;

Fig. 11 is a section taken along the line 11—11 of Fig. 6, looking in the direction of the arrows, and showing further details of the article gripper;

Fig. 12 is a view similar to Fig. 11 but showing further details of the article gripping conveyor;

Figure 15:
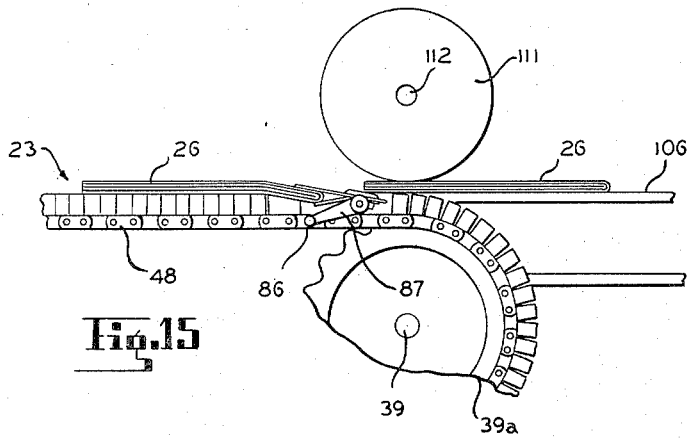
Fig. 15 is a view similar to Fig. 14, but showing one of the steps of delivering a labeled article to the delivery conveyor, and showing details of how the gripper with a gripped and labeled article engaged therein is moved beneath an article already in position on the delivery conveyor.
Figure 16:
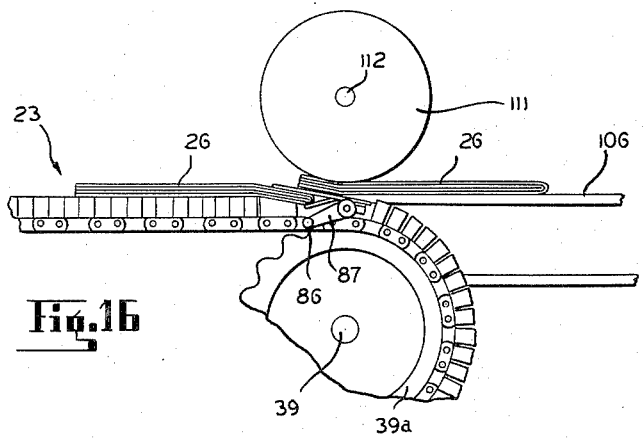
Figure 17:
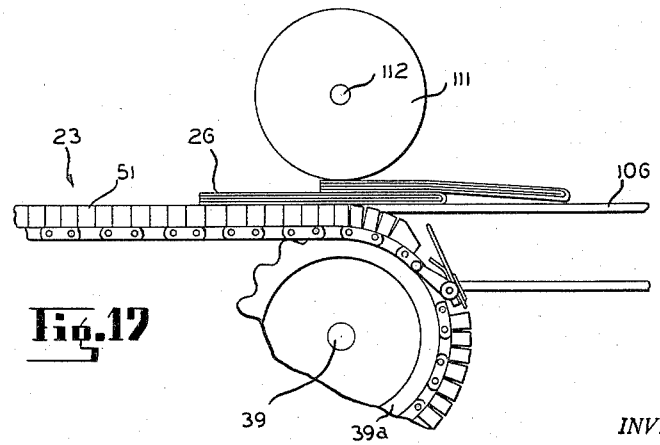

Fig. 16 is a view similar to Fig. 15, and showing how the gripper mechanism raises the trailing edge of a labeled article already in position on the delivery conveyor, whereby a gripped and labeled article is moved beneath the labeled article on the delivery conveyor; and Fig. 17 is a view similar to Fig. 16, and showing the labeled article as having been released by the gripper of the article conveyor, and in position for continued movement on the delivery conveyor in partial underlapping relationship with respect to the previous labeled article delivered to the delivery conveyor, whereby the labels which have been applied to the articles are in position for viewing of the indicia thereon.

Referring now particularly to Figs. 1 to 3 of the drawings, the improved label applying machine according to the present invention is referred to generally by the reference numeral 20, and includes a pair of laterally spaced side frames 21, forming a support for a feed hopper indicated generally by the reference numeral 22, an article gripping conveyor indicated generally by the reference numeral 23, and a label applying head referred to generally by the reference numeral 24.

A stack of articles 26, such as newpapers or magazines are stacked in the feed hopper 22, and the articles 26 are removed individually from the bottom of the stack to a position for engagement by the article gripping conveyor 23. The label applying head 24 applies an address label 27 to each article 26 as the article 26 is conveyed under the label applying head 24 by the article gripping conveyor 23.

Each of the articles 26, after having the label 27 applied thereto is moved beyond the label applying head 24 to a position for movement upon a delivery conveyor 28 where the articles are conveyed in partial overlapping relationship with the address label 27 in position for viewing, and placed on the title page in the case of a newspaper or the like, as seen in Fig. 2.

The portion of the improved label applying machine consisting of the feed hopper 22, the article gripping conveyor 23 and the label applying head 24, has the frame portions 21 thereof provided with outriggers 29, the ends of which are provided with adjusting screws 31. The lower ends of the adjusting screws terminate in pedestals 32 engaging the floor 33. The outriggers 29 are also provided with casters 34 which engage the floor 33 upon raising of the adjusting screws 31 so that the machine can be made portable if desired.

The feed hopper 22 may be of a type as more clearly described in Doane Patent No. 2,555,325, issued June 5, 1951, for Machine for Applying Address Labels to Mailing Pieces, or as shown in Ridenour Patent No. 2,606,681, issued August 12, 1952, for Machine for Applying Address Labels.

The bottom-most of the articles 26 is removed from the feed hopper 22 individually by article removing means which is driven from a variable speed motor drive 36 having a driving sprocket 37 which drives an orbitally movable driving sprocket chain 38 trained around a driving sprocket, not shown, having its center upon a shaft 39, and a sprocket, not shown, spaced therefrom and having its center upon a shaft 41, there being a take-up idler sprocket 42 mounted on a bracket 43 extending downward from one of the side frame members 21.

The article removing means for feed hopper 22 also includes feed rollers 44 and 46 which engage the bottom-most of the articles moved from the feed hopper 22 and which have been advanced thereto by means of a shuttle table 47.

Referring now to Figs. 6 to 10 of the drawings, each of the articles engaged by the feed rollers 44 and 46 is delivered to the article gripping conveyor 23, such conveyor gripping the leading edge of each of the articles 26. The article gripping conveyor 23 includes a pair of laterally spaced sprocket chains 48, each of which is driven by a sprocket 49 turning with the shaft 39 driven by the variable speed motor 36. Each sprocket chain 48 carries flights 51, see also Figs. 3, 6 and 7 which present supporting surfaces for the article 26 whilst being moved by the article gripping conveyor 26.

Figure 13:
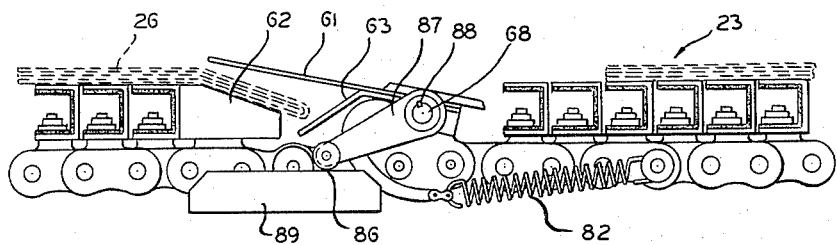
Fig. 13 is a side elevational view of the article gripper cooperates with a fixed cam to raise the gripper for the insertion therein of an article which has been fed thereto from a feed hopper seen in Fig. 1.
Figure 14:
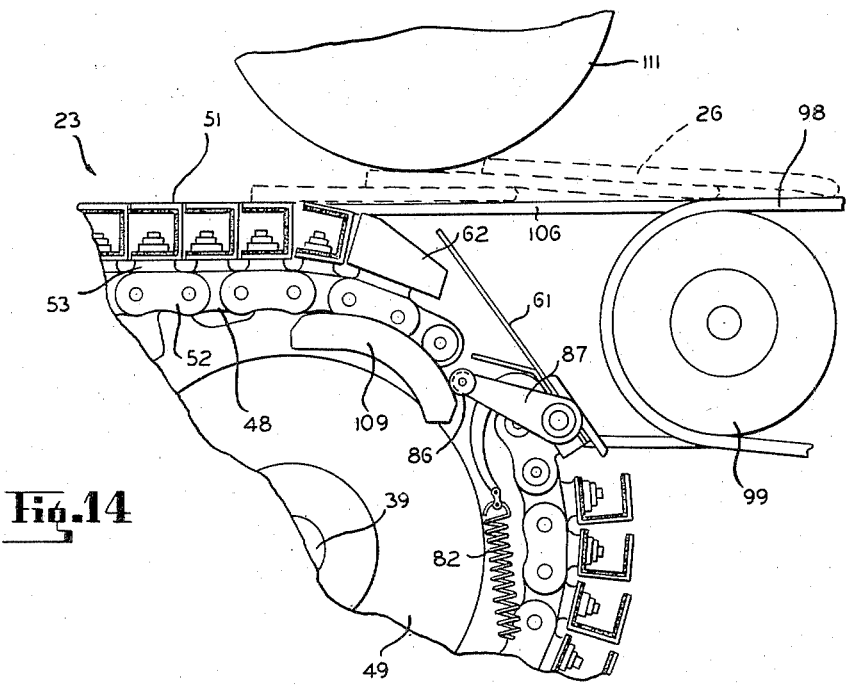
Fig. 14 is a side elevational view of the discharge end of the article gripping conveyor, showing how the labeled article has been released and delivered to the delivery conveyor in partial underlapping relationship with respect to articles which have been previously delivered to the delivery conveyor.

Each of the flight members 51 has a channel shaped cross section as seen with particular reference to Figs. 7, 13 and 14, and each is secured at a midpoint thereof to a pair of links 52 of the conveyor chain 48, each link 52 being provided with laterally extending ear-like extensions 53 forming a seat for the flight member 51. The flights are secured to the ears 53 by means of a countersunk screw 54 passing through the ear 53 and through a strap 56 extending for the distance between the ears 53, the strap 56 cooperating with lock nuts 57. Each of the flights is lined with sound absorbing material 55 which minimizes the noise made by the article gripping conveyor in its operation.

Referring now to Figs. 7, 11 and 13, means are provided for gripping the leading edge of an article 26 which has been advanced by the feed rollers 44 and 46, and to this end the conveyor chains 48 are each provided at intervals throughout their length with a gripping mechanism which is in an opened or article receiving position adjacent the feed hopper 22, and which moves to an article gripping position as the chains 48 move away from the feed hopper 22.

Each gripper mechanism is disposed at the forward end of each group of flights 51, and includes a gripper finger 61 normally in position as shown in Fig. 7 to grip the article 26, the gripper finger 61 exerting pressure against the article 26 and against a rest 62 carried by a link 52 of the conveyor chain 48. In receiving an article 26, the gripper finger 61 is raised as seen in Fig. 13 to receive the leading edge of the article 26 as it is fed by the feed rollers 46 and 44, see Fig. 1. The movement of the article 26 into the "bite" of the gripper finger 61 and between the rest 62 is limited by a finger 63 extending downward from each gripper finger 61.

Referring now to Figs. 11 and 12, the gripper finger 61 is held between a cover plate 64 and a support 66 by means of countersunk screws 67. The support 66 is arranged to tilt with a shaft 68, and the support 66 for gripper finger 61 is prevented from moving with respect to the shaft 68 by means of a socket head cap screw 69 threaded into a tapered bushing 71 which bears against the shaft 68 as seen in Fig. 11. As seen in Fig. 9 the shaft 68 is mounted in a sleeve 72 held between upstanding links 73, 73 of the endless chain 48. The sleeve 72 has spaced shoulders 74 against which the upper ends of the links 73 bear, and the ends of the sleeve 72 are abutted by the supports 66 for the gripper fingers 61.

As seen in Fig. 9, the chain 48 has extending therefrom chain link connecting pins 76 which terminate at each end in a roller 77. Each of the rollers 77 is guided upon a rail 78, to prevent side motion of the chain. The rails 78 extend for the length of the frame members 21 seen in Fig. 1, and prevent deflection of the chains 48 in a vertical direction.

Means are provided to rock the gripper arm 61 to a closed position to cause engagement of the article 26 between the rest 62 and the gripper 61, and to this end each support 66 has an arm 79 extending downward therefrom and to a position along side the chain 48, but spaced therefrom as seen in Figs. 9 and 10, and spaced also from the shaft 68 as seen in Fig. 11. The arm 79 has the free end thereof provided with a link 81, connected to a cylindrical spring 82, the spring 82 in turn being connected to a pin 83 of a chain link disposed in a forward direction of the gripper finger 61 and spaced also in a forward direction from the shaft 68. The tension in the spring 82 thereby causes the gripper finger 61 to rock in a counter clockwise direction with the article 26 engaged between the gripper finger 61 and the rest or block 62.

Means are provided for causing the gripper finger 61 to rock in a clockwise direction out of engagement with the rest or block 62, so as to receive an article 26 which has been moved from the hopper 22 by the shuttle table 47 and advanced by the feed rollers 44 and 46, so that the article 26 will thereafter be engaged between the gripper finger 61 and the block 62. To this end the shaft 68, see Figs. 6, 7 and 9, is provided with a cam follower 86 mounted at the end of a cam follower arm 87 held in position to rotate with the shaft 68 by means of a key 88, see also Fig. 9.

The cam follower 86 cooperates with a fixed cam 89, see Fig. 13, supported on the frame members 21. One such fixed cam is provided for each of the conveyor chains 48. The fixed cam 89 is disposed in position at a point forward of the feed rollers 44 and 46, so that when the article 26 is fed by the rollers 44 and 46, the gripper fingers 61 will have been rocked in a clockwise direction to the position seen in Fig. 13 to receive the article 26. As the cam follower 86 moves off the cam 89, the urgence of the spring 82 will cause the gripper finger 61 to rock in a counter-clockwise direction firmly to grip the article 26 between the block or rest 62 and the gripper finger 61.

The articles 26 are thus moved by the article gripping conveyor 23 in continuous and spaced relationship past the label applying head 24. The label applying head 24 is driven by a sprocket chain 91 trained around a sprocket 92 fast on a shaft 92a, sprocket 92 being driven by a sprocket, not shown, driven by the endless sprocket drive chain 38, which in turn is trained around an idler sprocket 93.

The precise details of the labeling head 24 form no part of the present invention, but for purposes of description herein includes a label applying roller 94, driven in synchronism with the moving articles 26 so as to apply thereto a severed and pasted label 27 as seen in Fig. 2.

The articles 26, after having the severed and pasted label applied thereto, are delivered to the delivery conveyor 28, where the articles are moved thereon in partial overlapping relationship as seen in Fig. 2, with successive labeled articles fed into a position beneath a previously labeled article by means as will now be described.

The delivery conveyor 28 includes a pair of side frames 94 supported upon legs 96 having their lower ends terminating in casters 97 for portability of the delivery conveyor 28. A pair of endless delivery belts 98 are trained about idler rollers 99 mounted on a shaft 99a supported between the side frames 94 and disposed at a point nearest the spaced frames 21, and around a driving roller 101 which is driven by a motor 102 mounted on the delivery conveyor 28 near the discharge end thereof and below the delivery belts 98. Tension is applied to the endless belts 98 by means of an idler 103 mounted on an arm 104 depending from the side frames 94 of the delivery conveyor 28.

The delivery conveyor 28 also includes an auxiliary endless conveyor 106 reeved at one end on the idler roller 99 for the endless belt 98, see Fig. 3, and reeved at its other end on an idler roller 107 supported on a shaft 108 extending between the side frames 21. Power for driving the auxiliary conveyor 106 is accordingly derived from the idler roller 99.

It will be noted from Fig. 3 that the load carrying reaches of the article gripping conveyor 23 and the delivery conveyor 28 are in alignment, and that the auxiliary conveyor 106 extends between the load carrying reaches described.

It should be noted at this point that the auxiliary conveyor 106 and the delivery conveyor belts 98 are arranged to travel at a speed less than that of the article gripping conveyor 23. For example, the article gripping conveyor may be considered as traveling at a speed of eighteen units per cycle, i.e., there are eighteen units of distance between each pair of gripper fingers 61 and the next pair of gripper fingers 61 on the article conveyor 23. However, the auxiliary conveyor 106 and the delivery conveyor 98 are so arranged as to have a speed considerably less than that of the delivery conveyor. For example, if the article gripping conveyor 23 is considered as traveling at eighteen units per cycle, the auxiliary conveyor 106 and the delivery conveyor 98 may be considered as having a speed of two units per cycle. This change in speed of the delivery conveyor and the auxiliary conveyor results in an underlap of the articles delivered to the delivery conveyor 28 by the article conveyor 23, as seen more particularly in Fig. 2, where a desired amount of underlap is had by the last unit delivered by the article gripping conveyor 23.

Means are accordingly provided whereby the greater speed of the article gripping conveyor can be used to deliver an article beneath the last previously delivered article to the delivery conveyor, whereby a desired amount of underlap may be achieved. This may be accomplished by apparatus which lifts the trailing edge of the last article delivered to the auxiliary conveyor 106 of the delivery conveyor 28. By so doing, the article delivered from the article gripping conveyor may be placed into position beneath the last such article placed upon the delivery conveyor, so that the desired amount of underlap is achieved. Such underlap results in a desired amount of exposure of the label, as seen in Fig. 2, whereby the mail room operator may readily sort the newspapers or magazines according to geographical districts.

As has been described previously the conveyor chain 48 is reversed in direction about the driving pulley 49, which is mounted upon the shaft 39 which is driven by the driving chain 38 in turn driven by the variable speed drive motor 36. The lifting of the trailing edge of the article in position upon the auxiliary conveyor 106 is later accompanied by release of the article from the article gripping conveyor 23, so that its speed, instead of having the speed of the article gripping conveyor 23 takes on the speed of the auxiliary conveyor 106.

As seen in Fig. 14, release of the gripper finger 61 from the article 26 is accomplished by cam 109 disposed to one side of the sprocket 49 and cooperating with the cam follower 86 and the cam follower arm 87 to rock the gripper finger 61 in a clockwise direction, thereby effecting release of the article 26. In addition thereto, such release of the gripper finger 61 is also accomplished by the shortened chordal length of the spring 82 and the arm 79 in moving around the periphery of the sprocket 49. Such release of the tension in the spring 82 greatly facilitates the lifting operation of the cam follower 86 and the cam follower arm 87 as will be understood.

In some applications the cam 109 for lifting the gripper finger 61 may not be needed. In such applications the movement of the gripper finger is analogous to a tangent to a curve (the curve in this case being the sprocket 39a) and the change in the slope of the tangent accomplishes the lifting action described of the trailing edge of the article 26 where the cam 109 is dispensed with the shortened chordal length of the spring 82 effects release of the article 26.

Means are provided to impose a gripping pressure upon the upper side of the article 26 delivered to the auxiliary conveyor 106, so that the lifting of the trailing edge of an article delivered thereon will not disturb the position of an article previously delivered to the conveyor 106. Referring also to Figs. 4 and 5, there is disposed in position corresponding to the point where the article conveyor lifts the trailing edge of an article which has been delivered to the delivery conveyor, a wheel 111 driven at a speed corresponding to the speed of the delivery conveyor 28. Wheel 111 is mounted between a pair of pressure arms 113 maintained a distance apart by means of a spreader member 114. The wheel 111 is mounted on a shaft 112 driven from the idler roller 99. The driving mechanism for the pressure wheel 111 consists of a bevel pinion 116 fast on the shaft 99a and meshing with a bevel pinion 117 on a splined shaft 118 supported within the pressure arm 113. The splined shaft 118 turns with a bevel pinion 119 meshing with a bevel 121 fast to the shaft 112 for the pressure wheel 111, see also Fig. 5.

As has been described, the pressure wheel 111 is driven at a speed corresponding to that of the auxiliary conveyor 106 and the delivery conveyor 28, so as to move the articles 26 in the partial underlapping relationship seen in Figs. 2 and 11. It will be noted from the foregoing description that it is possible to label the articles at an extremely high rate, and to deliver them to a delivery conveyor moving at a rate but a small fraction of the speed of the articles moving upon the article gripping conveyor. It will be observed that the delivery conveyor moves the articles in partial underlapping relationship with the label which has been applied to the articles in position for viewing by the operator. Such is extremely useful in mailing rooms where the labeled magazines or periodicals often times have long runs all to be delivered to different geographical districts such as village, town, county or the like.

The use of mechanism as described herein greatly increases the efficiency of a mailing room, since only a small amount of space is required for the mailing operation. By use of equipment described herein it is not necessary to have a delivery conveyor moving at right angles to the conveyor upon which the articles are labeled, such having been necessary previously to display the labels upon the articles.

While the invention has been described in terms of a preferred embodiment thereof, its scope is intended to be limited only by the claims here appended.

I claim as my invention:

1. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means thereon movable to an article gripping position for moving an article in such non-imbricating relationship, said second stage endless conveyor moving at a speed lower than said first stage conveyor, and means for effecting transfer from said first conveyor stage to said second conveyor stage comprising means actuating said gripping means to a position to lift the trailing edge of the last previous article delivered to said second stage endless conveyor.

2. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means thereon movable to a gripping position for moving an article in such non-imbricating relationship, said second stage endless conveyor moving at a speed lower than that of said first conveyor stage, and means for effecting transfer from said first conveyor stage to said second conveyor stage comprising means actuating said gripping means to a position to lift the trailing edge of said last previous article delivered to said second conveyor stage, said gripping means subsequently moving to a position releasing said article for its continued movement at the speed of said second conveyor stage.

3. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means having article grippers thereon movable to article receiving and subsequent article gripping position comprising a cam and a cam follower, said second stage endless conveyor moving at a speed lower than that of the first stage endless conveyor, and means for effecting transfer from said first stage endless conveyor to said second stage endless conveyor by lifting of the trailing edge of the last previous article transferred thereto comprising a second cam cooperating with said cam follower and said article gripper to release said article after having been transferred to said second stage conveyor.

4. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means thereon movable to an article receiving and a subsequent article gripping position, said second stage endless conveyor moving at a speed lower than that of said first stage endless conveyor, and means for effecting transfer from said first stage endless conveyor to said second stage endless conveyor comprising means actuating said gripping means to a position to lift the trailing edge of the last previous article delivered to said second stage endless conveyor whereby said articles will be placed thereon in underlying imbricating relationship.

5. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means movable to an article receiving and a subsequent article gripping position, said second stage endless conveyor moving at a speed lower than that of said first stage endless conveyor, and means for effecting transfer from said first stage endless conveyor to said second stage endless conveyor comprising means actuating said gripping means to a position to lift the trailing edge of the last previous article delivered to said second stage endless conveyor, the speed of said first stage endless conveyor enabling the article gripped thereby to move at its higher speed to a position of underlying imbricating relationship with respect to the last previous article delivered to said second stage endless conveyor.

6. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means movable to an article receiving and a subsequent article gripping position, said second stage endless conveyor moving at a speed lower than that of said first stage endless conveyor, and means lifting the trailing edge of the last previous article transferred to said second stage endless conveyor for effecting transfer from said first stage endless conveyor to said second stage endless conveyor.

7. In a conveyor for moving flat articles such as magazines or the like, a first stage endless conveyor for moving said articles in non-imbricating relationship and a second stage endless conveyor for moving said articles in underlying imbricating relationship, said first stage endless conveyor including a pair of laterally spaced grouped flights having gripping means at each group of flights movable to article receiving and subsequent article gripping position, said second stage endless conveyor moving at a speed lower than that of said first stage endless conveyor and including laterally spaced article conveying reaches in alignment with the laterally spaced flights of said first stage endless conveyor, an auxiliary conveyor for effecting transfer from said first stage endless conveyor to said second stage endless conveyor, said gripping means on said first stage endless conveyor lifting the trailing edge of the last previous article delivered to said auxiliary conveyor, said gripping means subsequently moving to a position releasing said article for its continued movement at the speed of said auxiliary and said second stage endless conveyor whereby said articles move on said last named conveyors in underlying imbricating relationship.

8. In a conveyor for moving flat articles such as magazines or the like, a first stage endless conveyor for moving said articles in non-imbricating relationship and a second stage endless conveyor for moving said articles in underlying imbricating relationship, said first stage endless conveyor including a pair of laterally spaced grouped flights having gripping means at each group of flights movable to article receiving and subsequent article gripping position, said second stage endless conveyor moving at a speed lower than that of said first stage endless conveyor and including conveying reaches in alignment with the laterally spaced flights of said first stage endless conveyor, an auxiliary conveyor for effecting transfer from said first stage endless conveyor to said second stage endless conveyor, said auxiliary conveyor having a conveying reach extending between the reaches and the spaced flights of said second stage and said first stage endless conveyors respectively and means lifting the trailing edge of the last previous article transferred to said auxiliary conveyor for effecting transfer thereto.

9. In a conveyor for moving flat articles such as magazines or the like, a first stage endless conveyor for moving said articles in non-imbricating relationship and a second stage endless conveyor for moving said articles in underlying imbricating relationship, said first stage endless conveyor including a pair of laterally spaced grouped flights having gripping means at each group of flights movable to article receiving and subsequent article gripping position, said second stage endless conveyor moving at a speed lower than that of said first stage endless conveyor and including laterally spaced article conveying reaches in alignment with the laterally spaced flights of said first stage endless conveyor, an auxiliary conveyor for effecting transfer from the first stage endless conveyor to the second stage endless conveyor and means lifting the trailing edge of the last previous article transferred to said auxiliary conveyor for effecting transfer thereto.

10. In a conveyor for moving flat articles such as magazines or the like, a first stage endless conveyor for moving said articles in non-imbricating relationship and a second stage endless conveyor for moving said articles in underlying imbricating relationship, said first stage endless conveyor including a pair of laterally spaced grouped flights having gripping means at each group of flights movable to article receiving and subsequent article gripping position, said second stage endless conveyor moving at a speed lower than that of said first stage endless conveyor and including laterally spaced article conveying reaches in alignment with the laterally spaced flights of said first stage endless conveyor, and means for effecting transfer from said first stage endless conveyor to said second stage endless conveyor whereby said articles will move on said second stage endless conveyor in underlying imbricating relationship by lifting the trailing edge of the last previous article transferred to said second conveyor.

11. In a conveyor for moving flat articles such as magazines or the like, a first stage endless conveyor for moving said articles in non-imbricating relationship and a second stage endless conveyor for moving said articles in underlying imbricating relationship, said first stage endless conveyor including gripping means movable to an article receiving and a subsequent article gripping position, said second stage endless conveyor moving at a speed lower than that of the first stage endless conveyor, and means for effecting transfer from the first stage endless conveyor to the second stage endless conveyor whereby said articles moving on said second stage endless conveyor are in underlying imbricating relationship by lifting the trailing edge of the last previous article transferred to said second stage endless conveyor.

References Cited in the file of this patent
UNITED STATES PATENTS

| Number | Name | Date |
|---|---|---|
| 1,615,194 | Swab | Jan. 18, 1927 |
| 2,262,798 | Elliot | Nov. 18, 1941 |
| 2,604,972 | Schmied | July 29, 1952 |
| 2,606,681 | Ridenour | Aug. 12, 1952 |
| 2,655,248 | Buccicone | Oct. 13, 1953 |
| 2,715,975 | Doane et al. | Aug. 23, 1955 |
| 2,748,917 | Rowe | June 5, 1956 |